United States Patent Office 2,792,378
Patented May 14, 1957

2,792,378

ORGANOPOLYSILOXANES COMPOUNDED WITH SULFUR DIOXIDE TREATED FILLERS

Paul A. Goodwin, Pittsfield, Mass., and Joseph C. Caprino, Cohoes, N. Y., assignors to General Electric Company, a corporation of New York No Drawing. Application October 20, 1954,
Serial No. 463,618

12 Claims. (Cl. 260—37)

This invention is concerned with improvements in organopolysiloxanes convertible to the cured, solid, elastic state. More particularly, the invention relates to certain filled organopolysiloxane compositions having reduced structure and lower knit time, said compositions comprising (1) an organopolysiloxane convertible to the cured, solid, elastic state and (2) a structure-forming filler treated with sulfur dioxide ($SO_2$).

When organopolysiloxanes convertible (for instance, by heat in the presence of a curing agent or by irradiation with high energy electrons) to the cured, solid, elastic state are mixed with certain fillers, especially certain finely divided silicas such as silica aerogel, fumed silicas, precipitated silicas, etc. (many examples of such finely divided fillers being described in Warrick Patent 2,541,137), it will be found that on standing even for short periods of time, for instance, even as little as one day, the compounded material becomes tough and nervy. This toughness and nerve of the filled, curable organopolysiloxane, which is also known as "structure," are recognized by the presence of an undesirable snap and difficulty in rendering plastic the rubber compound by usual mechanical working. These undesirable characteristics may occur even while these particular types of fillers are being added on suitable equipment to the aforementioned convertible organopolysiloxane. After incorporation of these structure-inducing fillers in the convertible organopolysiloxane, it will also be found that after the filled compound is stored for any length of time, for instance, from about two days to several months, this toughness and nerve increase to such a point that excessive milling times are required to form a plastic continuous film around the faster roll of a two-roll differential mill (whose rolls are operating at different speeds) normally used for rendering the stored compound plastic prior to further processing of the latter such as for purposes of incorporating other fillers and additives, for instance, curing agents, compression set additives, etc., or for "freshening" the filled compound so as to give better flow in subsequent molding, calendering, or extrusion operations. This inability to obtain a plastic film in a short period of time is due to the fact that the compound on the rolls will not knit readily within a reasonable period of time; in some instances the curable, filled compound will not knit at all even after long periods of milling, and it is often impossible to attain a satisfactory plastic (i. e., soft, pressure-flowable) condition with the result that the latter condition requires discarding the filled compound with obvious economic losses. The terms "knit" or "knitting" referred to in the present description are intended to mean the ready fusing of the laps and folds of a vulcanizable silicone rubber stock to form a continuous, homogeneous, textured sheet during milling. A more complete definition of this knitting property is found disclosed in the book, The Vanderbilt 1948 Rubber Handbook, page 79, ninth edition, published in 1948 by the R. T. Vanderbilt Company, 230 Park Avenue, New York, N. Y. The term "knit time" is intended to mean the time required to give this homogeneous, fused sheet.

Unexpectedly, we have discovered that by treating these finely divided fillers, particularly silica fillers, with $SO_2$ fumes, prior to incorporation in the convertible organopolysiloxane, it is possible to materially reduce the structure, while at the same time substantially reducing the knit time within which a plastic, continuous sheet can be attained on the rolls, thus making it much easier to mill the filled organopolysiloxane and to incorporate other additives. The incorporation of fillers treated in this manner gives the above desirable results even after the mixture of the convertible organopolysiloxane and the treated filler have been stored at normal or slightly elevated temperatures for times as high as two to four weeks or more.

It is therefore one of the objects of this invention to reduce the structure of filled, convertible organopolysiloxanes containing an ordinarily structure-inducing filler.

It is a further object of the invention to reduce the time in which a convertible organopolysiloxane containing a filler which in combination with the former ordinarily induces structure formation, can be milled to give a plastic, continuous sheet suitable for further processing, such as the incorporation of additives, such as curing agents, etc.

Another object of the invention is to enhance the storage stability of convertible organopolysiloxanes containing structure-inducing fillers, especially certain finely divided silica fillers, so that milling of the silicone rubber compound to freshen the latter for further processing does not require excessive milling times.

In the specification and in the claims, for brevity, the convertible organopolysiloxanes, which may be viscous masses or gummy solids (depending on the state of condensation of the starting organopolysiloxane, polymerizing agent, etc.), will hereinafter be referred to as "convertible organopolysiloxanes" or, more specifically, as "convertible methylpolysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950; all the foregoing patents being assigned to the same assignee as the present invention; Hyde Patent 2,490,357, issued December 5, 1949; and Warrick Patent 2,541,127, issued February 13, 1951.

It will, of course, be understood by those skilled in the art that other convertible organopolysiloxanes containing the same or different silicon-bonded organic substituents (e. g., methyl, ethyl, propyl, vinyl, allyl, phenyl, tolyl, xylyl, benzyl, phenylethyl, naphthyl, chlorophenyl, both methyl and phenyl, etc. radicals) connected to the silicon atoms by carbon-silicon linkages, may be employed in the present invention without departing from the scope of this invention. The particular convertible organopolysiloxane used is not critical and may be any one of those described in the foregoing patents generally obtained by condensation of a liquid organopolysiloxane containing an average of from about 1.95, preferably from about 1.98 to about 2.05 organic groups per silicon atom. The condensing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which may contain, if desired, for example, up to 2 mol percent copolymerized monoorganosiloxane, for example, copolymerized monomethylsiloxane and small molar concentrations of linear organopolysiloxanes, such as decamethyltetrasiloxane. Generally, we prefer to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups per silicon atom, and where preferably more than 50 percent, e. g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e. g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$ where R is preferably a radical of the group consisting of methyl and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e. g., from 1 to 20 or more mol percent) of any of the following units, alone or in combination therewith: $C_6H_5(CH_3)SiO$ and $(C_6H_5)_2SiO$. The presence of halogen, e. g., chlorine, atoms on the phenyl nucleus is not precluded.

It was entirely unexpected and in no way could have been predicted that this specific treatment of the filler would exercise such marked influence in reducing the structure and knit time of convertible organopolysiloxanes containing fillers which ordinarily induced structure formation. Thus, it was found that treatment of the filler with an acidic gas such as carbon dioxide failed to exercise any improvement on the knit time or in the structure build-up. Treatment of the filler with HCl fumes, although it improved the knit time somewhat, nevertheless the HCl-treated filler undesirably softened the rubber compound when the treated filler was incorporated in the convertible organopolysiloxane; in addition, treatment of the filler with the hydrogen chloride gas undesirably lowered the tensile strength and the percent elongation of the cured or vulcanized, filled silicone rubber. Even the addition of other acidic materials such as boric and benzoic acids to the filler to give pH values within the range advantageously employed in the practice of our invention, failed to give any improvement in the knit time or structure build-up and undesirably affected the physical properties of the cured, filled silicone rubber.

The finely divided fillers which have caused the above-described structure build-up and undesirable length of time for knitting of the convertible organopolysiloxane are usually finely divided silica fillers, many of which are free of hydroxyl groups either in the form of adsorbed moisture of silicon-bonded hydroxyl groups, depending on the method by which they are prepared. Under some conditions of manufacture, these structure-inducing fillers may, however, contain hydroxyl groups, for instance, hydroxyl groups bonded directly to silicon of the silica molecule, but due to modification of such silicas, for instance, by the introduction of silicon-bonded alkoxy groups in place of some of the silicon-bonded hydroxyl groups, increased structure and knit times result when these types of silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such structure-causing silica fillers may be found described in U. S. Patents 2,541,137; 2,610,167 and 2,657,149. Such structure-causing fillers may be slightly acidic or alkaline (i. e., have pH's below or above 7) depending upon the method of manufacture, and may be obtained through an aerosol-aerogel process, by fuming processes such as by the vapor phase burning of silicon tetrachloride or ethyl silicate, etc.

Another finely divided reinforcing filler which has been employed with convertible organopolysiloxanes but which also imparts undesirable structure to the convertible organopolysiloxane is a finely divided gamma alumina of average particle size less than 100 millimicrons. Such a filler and its use in combination with convertible organopolysiloxanes are more particularly described and claimed in the patent of Richard M. Savage, U. S. 2,671,069, issued March 2, 1954 and assigned to the same assignee as the present invention. Treatment of the above gamma alumina with the $SO_2$ fumes will also reduce the structure build-up in mixtures of the gamma alumina and the convertible organopolysiloxane while also greatly reducing the knit time.

The amount of the $SO_2$-treated structure-inducing filler used in combination with the convertible organopolysiloxane may be varied within wide limits, for instance, from about 10 to 200 percent, by weight, of the treated filler based on the weight of the convertible organopolysiloxane. The exact amount of treated filler used will depend upon such factors as, for instance, the application for which the convertible organopolysiloxane is intended, the type of filler employed (e. g., density of the filler), the type of convertible organopolysiloxane employed, etc. Obviously, mixtures of these treated reinforcing fillers, either alone or in combination with non-reinforcing fillers where the reinforcing filler comprises a sufficient amount, usually a majority of the weight of the fillers, to cause the undesirable structure build-up and increased knit time, may also be employed. Examples of other fillers which may be incorporated in combination with the structure-inducing fillers may be, for instance, titanium dioxide, lithopone, zinc oxide, zirconium silicate, iron oxide, calcium carbonate, etc. Mixtures of these fillers may also be used.

Various curing agents to effect more rapid conversion of the convertible organopolysiloxane to the cured, solid elastic state may be incorporated. Among such curing agents may be mentioned, for instance, benzoyl peroxide, tertiary butyl perbenzoate, chlorobenzoyl peroxide, dichlorobenzoyl peroxide (i. e., those in which two chlorine atoms are present on each phenyl nucleus), etc. These curing agents (or "vulcanization accelerators" as they are often designated) may be present in amounts ranging from about 0.1 to as high as 4 to 8 percent or more, by weight, based on the weight of the convertible organopolysiloxane. High energy electron irradiation without curing agents may also be employed for vulcanizing purposes.

The manner of treatment of the finely divided fillers with the sulfur dioxide is relatively simple. One method which we have found convenient for the purpose is to charge the finely divided filler to a vertically positioned tube and pass the $SO_2$ gas up through the tube and filler for a period of time advantageously around 5 to 45 minutes or more. Obviously, this time of treatment with the sulfur dioxide may be varied widely, it being only necessary to insure intimate mixing of the finely divided filler with the sulfur dioxide gas so that all the particles of the filler come in contact with the gaseous sulfur dioxide.

One indication of attainment of a satisfactory level of treatment with the sulfur dioxide gas is measurement of the pH of the treated filler. In general, the pH of the treated filler should be from about 4.5 to 7 when tested with a Beckman pH meter using 1 gram of the treated filler intimately dispersed in 50 cc. of distilled water, the measurement with the pH meter taking place after the mixture of treated filler and water has been allowed to stand for at least 30 minutes.

After treatment of the finely divided filler with the sulfur dioxide, the treated filler is incorporated in the convertible organopolysiloxane in the manner well known in the art using, for example, the usual rubber differential milling rolls. It will be found that this treated filler can be incorporated readily in the convertible organopolysiloxane without undue structure build-up, in contrast to the long periods of time required when incorporating an untreated structure-inducing filler, such as silica aerogel. In addition, shorter periods of time will be required to obtain a filled silicone rubber compound which will adhere readily to the rolls and which will give a continuous solid sheet in contrast to the non-continuous lace-like effect encountered using a non-treated filler for incorporation in the convertible organopolysiloxane. During this dispersion of the treated filler in the gum, other ingredients usually employed with the silicone rubber compound, such as dyes, pigments, oxidation inhibitors, etc., may also be added at this point.

When the silicone rubber compound is to be molded, the latter is heated in a mold at temperatures of the order of about 100° to 150° C. for varying lengths of time, for instance, from about 5 to 30 minutes or more. Molding pressures ranging from about 10 to 500 p. s. i. or more are advantageously used. The molded product is preferably given a further heat treatment at elevated temperatures, for example, for about 1 to 36 hours or more at 150° to 250° C. to bring out the optimum properties of the cured organopolysiloxane.

Where desired, solvent and dispersing media such as toluene, xylene, butanol, etc. may be employed to make solutions and dispersions for coating and impregnating purposes. These coating compositions may be used to treat (e. g., coat and impregnate) various sheet materials such as glass cloth, asbestos cloth, mica sheets, various fibers, and finely divided fillers, such as mica, glass fibers, asbestos floats, etc. Such treated products may be heated at the requisite temperature to remove solvent or dispersing media (if coating compositions are involved), and thereafter further heat-treated at the elevated temperatures recited previously to convert the organopolysiloxane to the cured, solid, elastic state.

In order that those skilled in the art may better understand how the present invention may be practiced, the following examples are given by way of illustration and not by way of limitation. All parts are by weight.

In the following examples, the various $SO_2$-treated fillers employed with the convertible organopolysiloxane were obtained by charging the finely divided filler to a chromatographic column 1.5" in diameter and 24" long. The column was fitted with a fritted glass bottom and sulfur dioxide gas was blown up through the bed of finely divided filler for 30 minutes at a sufficient rate fast enough to fluidize the bed of finely divided filler. After each filler was treated with sulfur dioxide gas, it was removed from the column and placed in a sealed container until such time as it was used for compounding with the convertible organopolysiloxane.

In the following examples, the convertible organopolysiloxane employed was a convertible methylpolysiloxane obtained by hydrolyzing dimethyldichlorosilane, isolating substantially pure octamethylcyclotetrasiloxane and condensing the latter with about 0.01%, by weight, thereof potassium hydroxide at a temperature of 140–150° C. until a benzene-soluble, highly viscous mass was obtained. This benzene-soluble methylpolysiloxane had a ratio of approximately two methyl groups per silicon atom. Further directions for preparing these convertible methylpolysiloxanes may be found described in Linville application Serial No. 363,940, filed June 24, 1953 (now U. S. Patent 2,739,952 issued March 27, 1956), and assigned to the same assignee as the present invention.

The knit time test employed in the following examples was conducted as follows: A two-roll differential laboratory mill, 3" x 8", was employed in which the speed ratio was 1.4 to 1 and the faster roll revolved at a speed of about 60 revolutions per minute. The mill roll clearance was adjusted to pass a 12 mil thick soft solder slug at a temperature of around 70° to 90° F. In conducting the test for knit time, 30 grams of the compound under test were added to the nip of the roll in small pieces to permit passage therethrough. A preliminary pass often was required at a somewhat slightly wider setting to reduce the sample thickness. When all of the compound had passed through the nip once, a stop watch was triggered and the timing begun: The compound was added to the nip again and in order to keep the "bank" of compound in motion, it was sometimes necessary to open the mill slightly for a brief interval and then return to the predetermined 12-mil adjustment. The timing was continued until the compound became plastic and completely covered the width of the faster roll in the form of a continuous solid film. As soon as this happened, the timing was stopped and the elapsed time was recorded as "knit time."

EXAMPLE 1

In this example, silica aerogel was calcined by heating it at 650° C. for about 48 hours and thereafter treated with sulfur dioxide gas in the manner described above. 100 parts of the above-identified convertible methylpolysiloxane, 40 parts of the treated filler, and 1.65 parts benzoyl peroxide were mixed together on mixing rolls and samples of this mixture allowed to remain and age at room temperature (about 25–30° C.) for varying lengths of time and thereafter each mixture of ingredients was again milled on the rolls and the knit time measured as described above. Samples of each mixture of ingredients were then molded in the form of flat sheets at a temperature of about 150° C. for about 15 minutes at about 1000 p. s. i. and thereafter further heat-treated for 24 hours at 250° C., after which the tensile strength and percent elongation of each sample were determined. Control samples were also evaluated and molded in which untreated calcined silica aerogel was employed as a filler with the same convertible methylpolysiloxane and benzoyl peroxide as used above, employing the same weight ratio of ingredients. The following Table I shows the results of the tests conducted on the various samples recited above.

*Table I*

| Age of Compound (Days) | Type of Filler | Knit Time (Mins.) | Elongation (percent) | Tensile Strength (lbs./in.²) |
|---|---|---|---|---|
| 2 | Untreated | 12 | 180 | 580 |
| 2 | $SO_2$-treated | 3 | 125 | 635 |
| 7 | Untreated | 10 | 150 | 635 |
| 7 | $SO_2$-treated | 5 | 200 | 675 |
| 22 | Untreated | 12 | 165 | 665 |
| 22 | $SO_2$-treated | 4 | 150 | 645 |

EXAMPLE 2

A silicone rubber compound was prepared by mixing together 100 parts of the above-mentioned convertible methylpolysiloxane, 40 parts of a finely divided reinforcing structure-inducing, fumed silica (prepared in the vapor phase by burning $SiCl_4$, and known as "Aerosil" sold by the Godfrey L. Cabot Company, Boston, Massachusetts), and 1.64 parts benzoyl peroxide employing the usual rubber differential mill. Another vulcanizable silicone rubber compound was prepared employed the same ratio of ingredients, but instead using the aforesaid Aerosil which was previously treated with sulfur dioxide gas in the same manner as described above, so that the pH of the Aerosil in water was about 4.88. Other samples of the Aerosil filler were treated in one instance with carbon dioxide gas to a pH of about 4.9 and in another instance with HCl gas to a pH of 4.11. Each of these treated fillers was incorporated in the above-described convertible methylpolysiloxane and molded under heat and pressure and thereafter heat-aged similarly as described in Example 1. Each unvulcanized mixture of ingredients described above was tested for knit time and mill time after the curable, filled silicone rubber compound was allowed to remain and gas at room temperature for about 90 hours. After vulcanization, each sample was also tested for tensile strength and elongation. The results of these tests are described in Table II below.

*Table II*

| Gas Used to Treat Aerosil | Knit Time (Mins.) | Elongation (percent) | Tensile Strength (lbs./in.$^2$) |
|---|---|---|---|
| None | 13 | 300 | 790 |
| $CO_2$ | 12 | 250 | 750 |
| $SO_2$ | 5 | 290 | 720 |
| HCl | 1st pass | 165 | 545 |

EXAMPLE 3

One of the advtanges obtained by treatment of the reinforcing silica with the sulfur dioxide gas is an improvement in the heat resistance of the vulcanized product. This example illustrates this result. More particularly, 100 parts of the above-mentioned convertible methylpolysiloxane were mixed with 1.65 parts benzoyl peroxide and 40 parts of sulfur dioxide-treated calcined silica aerogel described in Example 1. Samples of this mixture of ingredients were molded for 15 minutes at 150° C. at 1000 p. s. i. and thereafter heated in an oven for 1 hour at 150° C., and 24 hours at 250° C. Control sheets were also molded from the same formulation but employing calcined silica aerogel which was not treated with the sufur dioxide. Samples of the cured products containing treated and untreated silica aerogel filler were weighed and placed in a 250° C. air-circulating oven and the weight loss of each sample calculated over a period of 15 days. The cured product containing as a filler the $SO_2$-treated silica lost weight as follows:

0.61%—after 2 days
1.75%—after 8 days
3.28%—after 15 days

The cured sample containing untreated silica as the filler lost weight as follows:

1.11%—after 2 days
2.91%—after 8 days
5.36%—after 15 days

Of additional significance was the fact that the cured product using the $SO_2$-treated filler had consistently better elongation and changed less in hardness during the 15-day heating period than did the sample filled with the untreated silica aerogel.

EXAMPLE 4

Because of the reduction in structure build-up caused by the filler, it is possible to incorporate larger amounts of certain of the finely divided silica fillers, particularly silica aerogel, than has heretofore been possible. Because of this, one can obtain cured products having higher tear strengths than are usually realized employing smaller amounts of these finely divided reinforcing fillers. More particularly, silica aerogel treated with sulfur dioxide as described above was incorporated in 100 parts of a convertible methylpolysiloxane described above, but additionally treated by washing the convertible silicone gum with water to remove essentially all the potassium hydroxide or other siloxane-rearranging ingredients present in the gum, and thereafter removing from the gum substantially all volatile materials boiling up to about 200° C. Two formulations were prepared; in one instance, 60 parts $SO_2$-treated silica aerogel were used and in another instance 70 parts of $SO_2$-treated silica aerogel were employed with the convertible methylpolysiloxane. Each sample was pressed at around room temperature into the form of a sheet about 0.07" thick, and the sheets cured by placing them in an ammonia gas atmosphere (contact with liquid ammonia may also be used) for about 40 minutes, and the physical properties of each sample tested. The formulation containing 60 parts of treated filler had a tensile strength of 780 p. s. i., an elongation of 250%, and a tear strength of about 155 lbs./inch. The sample containing 70 parts treated silica aerogel had a tensile strength of 715 p. s. i., a percent elongation of about 190, and a tear strength of about 150 lbs./inch.

It will, of course, be apparent to those skilled in the art that amelioration of the undesirable effects of other structure-inducing fillers, as well as fillers which cause undesirably long knit times, is intended to be included within the scope of the present invention. Moreover, other convertible organopolysiloxanes, for instance, convertible ethylpolysiloxanes, may be employed in place of the convertible methylpolysiloxanes described in the foregoing examples. The proportions of ingredients may be varied widely as may the other conditions recited above without departing from the scope of the invention. The application involved, the organopolysiloxane used, the filler employed, etc., will all contribute to the relationship between the ingredients as far as proportions and selection thereof are concerned. Obviously, other fillers which do not induce structure or which do not undesirably affect knit time, such as, for instance, titanium dioxide, ferric oxide, calcium carbonate, etc., may be incorporated in combination with the structure-inducing fillers.

The compositions herein described having reduced structure and lower knit times can be advantageously employed in extrusion, molding, and calendering applications. Alternatively, these compositions may be dissolved and/or dispersed in suitable solvents or dispersing agents and used for coating and impregnating purposes for coating glass tape, glass fibers, glass fiber sheets, asbestos cloth, etc. In the latter instance, glass cloth can be coated with the convertible organopolysiloxanes herein described containing filler and curing agent, and thereafter the coated glass cloth can be wrapped around mandrels to make heater ducts and cured under heat and pressure to give unitary structures having outstanding heat resistance. The significance of the reduction of structure lies in the ability to readily plasticize a filled silicone compound within commercially feasible times by mechanical action on suitable equipment after the compound has been stored for long periods of time, and thereafter to use it in any of the above-identified applications by normal fabricating techniques. Compounds prepared in the above manner can be readily extruded over electrical conductors and can be heat-treated at elevated temperatures in order to obtain a smooth, coherent, cured insulation having outstanding thermal stability.

What we claim as new and desire to secure by Letters Patent of the United States is:

1. A composition of matter having reduced structure and lower knit time which comprises (1) an organopolysiloxane convertible to the cured, solid, elastic state and containing an average of from 1.95 to 2.05 organic groups per silicon atom and (2) a structure-inducing filler selected from the class consisting of finely divided silica and gamma alumina fillers treated with sulfur dioxide.

2. A composition of matter as in claim 1 in which the filler is a finely divided structure-inducing silica filler.

3. A composition of matter having reduced structure and lower knit time comprising (1) an organopolysiloxane convertible to the cured, solid, elastic state and containing an average of from 1.95 to 2.05 organic groups per silicon atom in which the organic groups are selected from the class consisting of methyl and phenyl radicals, at least 50% of the organic groups being methyl groups and (2) a structure-inducing filler selected from the class consisting of finely divided silica and gamma alumina fillers treated with sulfur dioxide.

4. A composition as in claim 3 in which the filler is a finely divided structure-inducing silica filler.

5. A composition of matter having reduced structure and lower knit time which comprises (1) a methylpolysiloxane convertible to the cured, solid, elastic state and containing an average of from 1.95 to 2.05 methyl groups per silicon atom and (2) a finely divided structure-inducing silica filler treated with sulfur dioxide gas.

6. A composition of matter having reduced structure and lower knit time which comprises (1) a methyl phenyl-polysiloxane convertible to the cured, solid, elastic state and containing an average of from 1.95 to 2.05 total methyl and phenyl groups per silicon atom and (2) a finely divided structure-inducing silica filler treated with $SO_2$ gas.

7. A composition of matter having reduced structure and lower knit time which comprises (1) an organopolysiloxane convertible to the cured, solid, elastic state and containing an average of from 1.95 to 2.05 organic groups per silicon atom, (2) a structure-inducing filler selected from the class consisting of finely divided silica and gamma alumina fillers, treated with sulfur dioxide gas, and (3) a curing agent for (1).

8. The cured product of claim 7.

9. A composition of matter having reduced structure and lower knit time which comprises (1) a methylpolysiloxane convertible to the cured, solid, elastic state and containing an average of from 1.95 to 2.05 organic groups per silicon atom, (2) a finely divided structure-inducing silica filler selected from the class consisting of finely divided silica and gamma alumina fillers treated with sulfur dioxide fumes, and (3) a curing agent for (1) comprising benzoyl peroxide.

10. The cured product of claim 9.

11. A composition of matter having reduced structure and lower knit time comprising (1) an organopolysiloxane convertible to the cured, solid, elastic state and containing an average of from 1.95 to 2.05 organic groups per silicon atom, (2) a structure-inducing filler selected from the class consisting of finely divided silica and gamma alumina fillers treated with sulfur dioxide, and (3) a curing agent for (1) comprising dichlorobenzoyl peroxide.

12. The cured product of claim 11.

No references cited.